(No Model.)
J. MOSES.
WAGON.
No. 281,913. Patented July 24, 1883.
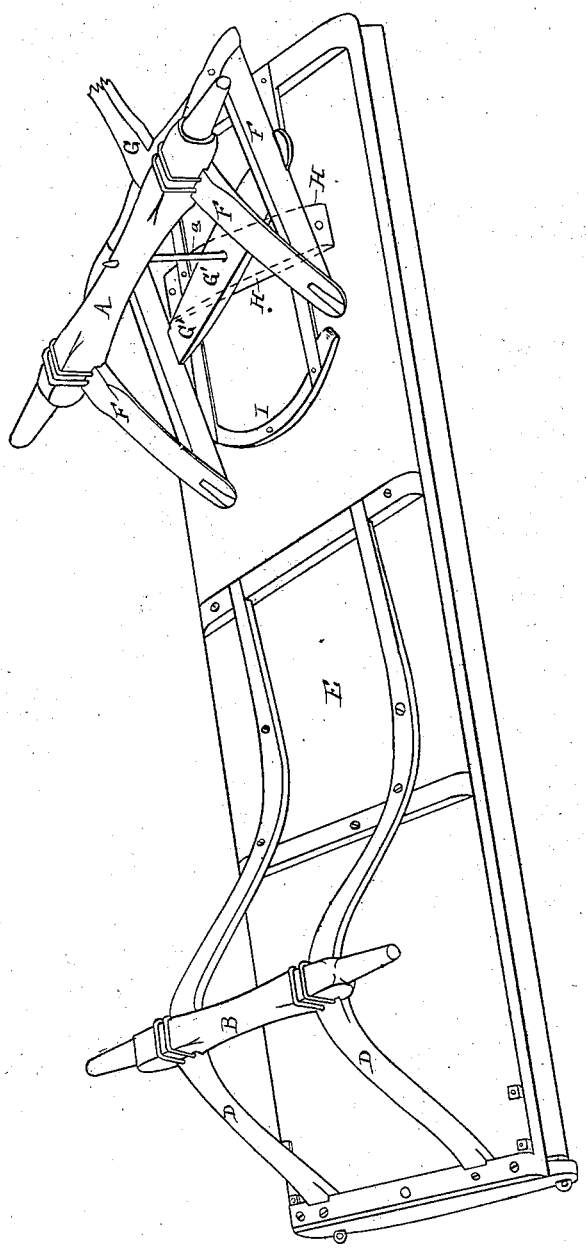
Attest:
N. Sprague
E. Scully
Inventor.
Joseph Moses.
By Thos. S. Sprague
Att'y.

UNITED STATES PATENT OFFICE.

JOSEPH MOSES, OF LAPEER, MICHIGAN.

WAGON.

SPECIFICATION forming part of Letters Patent No. 281,913, dated July 24, 1883.

Application filed May 10, 1883. (No model.)

*To all whom it may concern:*

Be it known that I, JOSEPH MOSES, of Lapeer, in the county of Lapeer and State of Michigan, have invented new and useful Improvements in Wagons; and I do hereby declare that the following is a full, clear, and exact description thereof, reference being had to the accompanying drawings, which form a part of this specification.

This invention relates to certain new and useful improvements in the construction of wagons, all as more fully hereinafter set forth.

In the accompanying drawings, my invention is shown in a bottom perspective, in which A B represent the front and rear axles, respectively. The rear axle, B, has rigidly clipped to it the C-shaped bearing-bars D, the rear ends of which are rigidly secured to the bottom of the bed or body E, while the forward ends are extended forward and secured rigidly to the bottom of the bed in any convenient manner, as shown, thus securely attaching the rear axle to the bed by a support, which also braces and sustains the center of the body. The front axle has rigidly mounted upon it the D-shaped bearing-frames F, between the forward ends of which the tongue G is hung in any suitable manner, so that the draft is applied directly to such bearing-frames F. The top faces of the bearing-frames are connected together by means of a slightly-arched bearing-plate G'. Immediately over the axle and upon the bottom of the bed E is rigidly secured a similar arched bearing-plate, H, inverted, which rests when the wagon is together upon the bearing-plate G', the whole being secured together by means of the king-bolt *a*, which passes down through the bed E and bearing-plates G H to the front axle, thereby preventing the tilting of the front axle. At the rear of the bearing-plate H, and to the bottom of the bed E, is secured a circle-iron, I, which rests upon the top of the supporting-frames F in turning. By this manner of construction I produce a wagon which is simple, but strong and durable in its parts, and one that can be turned entirely about within its length as the bed is raised sufficiently above the wheels to allow them to pass under it.

What I claim as my invention is—

1. In combination with the bed E of a wagon, the arched bearing-plates G' H, D-shaped bearing-frames F, and axle A, substantially as and for the purposes set forth.

2. In combination with the bed E of a wagon, the C-shaped bearing-bars D, having both their ends fastened directly to the frame of the bed, and their forward ends extending under the center thereof to rigidly support the same upon the rear axle, B, substantially as described.

3. A wagon consisting of the axles A B, C-shaped bearing-bars D, bed E, D-shaped bearing-frames F, arched bearing-plates G' H, when constructed and arranged, substantially as herein described.

JOSEPH MOSES.

Witnesses:
H. S. SPRAGUE,
E. SCULLY.